(12) United States Patent
Sanvido

(10) Patent No.: US 7,694,105 B2
(45) Date of Patent: Apr. 6, 2010

(54) DATA STORAGE SYSTEMS THAT IMPLEMENT SECTOR SETS

(75) Inventor: Marco Sanvido, Belmont, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 398 days.

(21) Appl. No.: 11/843,602

(22) Filed: Aug. 22, 2007

(65) Prior Publication Data

US 2009/0052311 A1    Feb. 26, 2009

(51) Int. Cl.
*G06F 12/10* (2006.01)

(52) U.S. Cl. .................... 711/203; 711/4; 711/161; 711/162; 711/165; 707/203; 707/204

(58) Field of Classification Search .......... 711/4, 711/161, 162, 165, 203, 209; 707/201, 203, 707/204; 717/170
See application file for complete search history.

(56) References Cited

U.S. PATENT DOCUMENTS

| 7,315,870 | B2 * | 1/2008 | Mukaida ................. 707/203 |
| 7,603,530 | B1 * | 10/2009 | Liikanen et al. ......... 711/162 |
| 2002/0147862 | A1 | 10/2002 | Traut et al. |

* cited by examiner

*Primary Examiner*—Jack A Lane
(74) *Attorney, Agent, or Firm*—Steven J. Cahill

(57) ABSTRACT

A data storage device has a data storage medium configured to store a first version of data in parent sectors. The data storage device is configured to store a second version of the data in child sectors. The child sectors have the same logical block addresses as the parent sectors. A host operating system can read data from or write data to the child sectors by sending logical block addresses and a sector set number to the data storage device. The logical block addresses and the sector set number identify the child sectors. In response to receiving a request to access the child sectors, the data storage firmware identifies physical addresses that correspond to the logical block addresses and the sector set number. The data storage device uses the physical addresses to identify the location of the child sectors.

20 Claims, 4 Drawing Sheets

DATA STORAGE SYSTEMS THAT IMPLEMENT SECTOR SETS

BACKGROUND OF THE INVENTION

The present invention relates to data storage systems, and more particularly, data storage systems that implement sector sets.

A storage device writes data to and reads data from blocks (sectors) on a storage medium. Writes to a sector are irreversible in that the storage system cannot revert the content of a sector to a previous state. Once data is written to a sector, the old data is overwritten and lost.

In normal system operation, write operations are intended to permanently overwrite old data. However, some specialized applications, such as virtualized system files and log structured files systems, could greatly benefit if the storage device would automatically retain the old data as well. Therefore, it would be desirable to provide techniques for retaining old versions of data stored in data storage devices.

BRIEF SUMMARY OF THE INVENTION

According to some embodiments of the present invention, a data storage device has a data storage medium configured to store a first version of data in parent sectors. The data storage device is configured to store a second version of the data in child sectors. The child sectors have the same logical block addresses as the parent sectors.

A host operating system can read data from or write data to the child sectors by sending logical block addresses and a sector set number to the data storage device. The logical block addresses and the sector set number identify the child sectors. In response to receiving a request to access the child sectors, data storage firmware identifies physical addresses that correspond to the logical block addresses and the sector set number. The data storage device uses the physical addresses to identify the location of the child sectors.

Various objects, features, and advantages of the present invention will become apparent upon consideration of the following detailed description and the accompanying drawings.

DETAILED DESCRIPTION OF THE INVENTION

According to some embodiments of the present invention, data storage systems are configured to store multiple versions of data in sector sets. Each version of the data is stored in a different sector set. A data storage system can store temporary edits to a file without modifying the originally stored copy of the file. Subsequently, the edits to the file can be made permanent by overwriting the original copy of the file. Alternatively, the edits to a file can be overwritten or discarded.

For example, an application that needs to store multiple versions of a file can utilize techniques of the present invention. After a file is stored on a data storage device, the data storage device stores each additional version of the file in a different sector set. A host operating system can access the newest version of the file or any of the older versions of the file from the data storage device.

Although many embodiments of the present invention are described herein in the context of magnetic hard disk drives, it should be understood that the techniques of the present invention can be applied to other types of data storage devices, such as optical disk drives.

Figure 1:
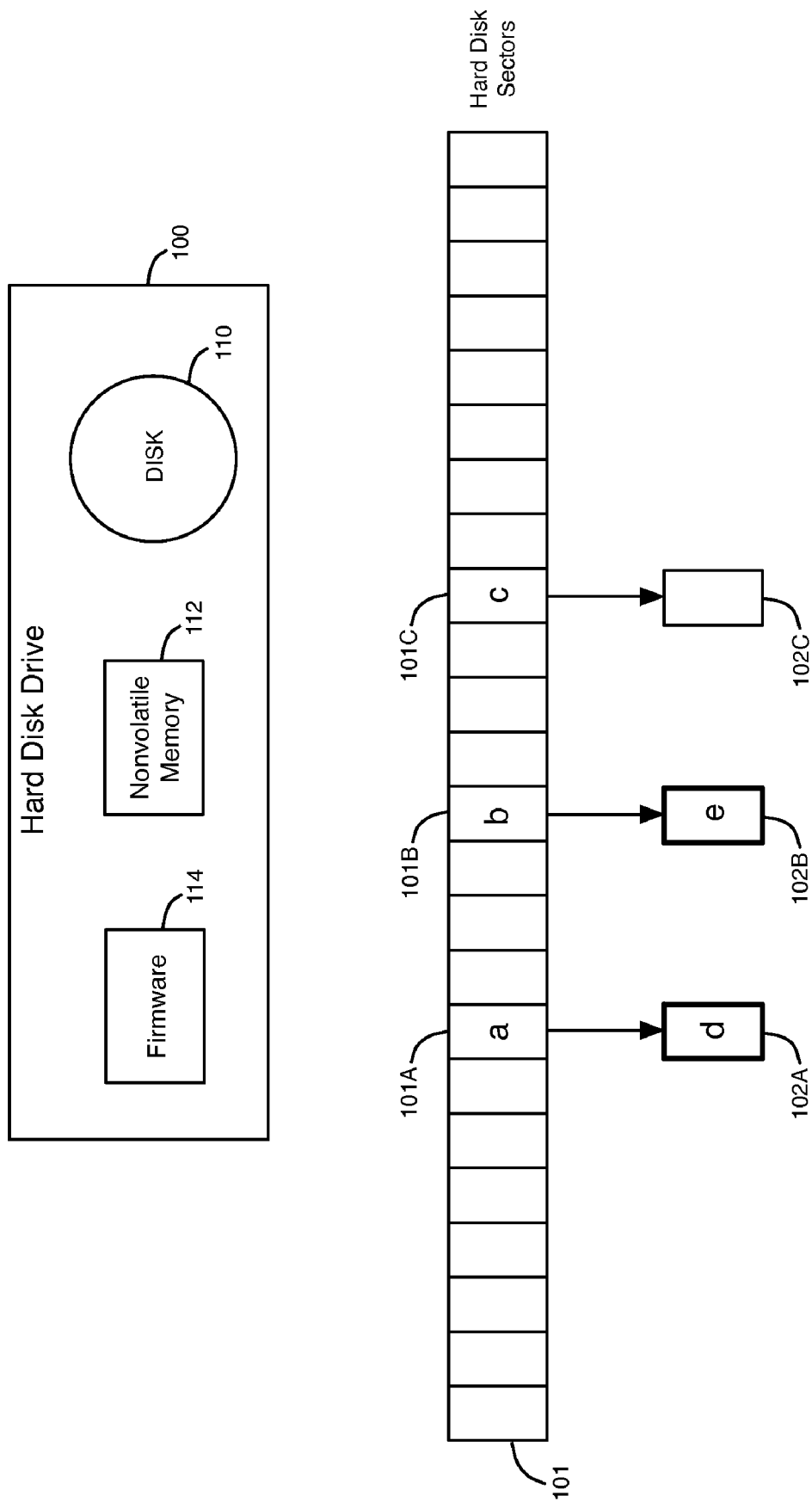
FIG. 1 illustrates an example of sector sets, according to an embodiment of the present invention.

FIG. 1 illustrates an example of sector sets, according to an embodiment of the present invention. FIG. 1 shows a set of sectors 101 that are located in a circular track on magnetic hard disk 110 within a hard disk drive 100. Sectors 101 include sectors 101A, 101B, and 101C. Sectors 101A-101C are in a first sector set. The first sector set stores an original version of a data file.

Firmware 114 in hard disk drive 100 can implement versioning control for storing multiple versions of data, according to an embodiment of the present invention. In the example of FIG. 1, sectors 101A, 101B, and 101C are in a set of logical block addresses (LBAs) that are under versioning control. Sectors 101A-101C can be an ordered set of sectors. Firmware 114 allocates a set of spare sectors 102A, 102B, and 102C to a sector set for storing a different version of the data stored in sectors 101A-101C.

Sectors 101A-101C are parent sectors, and sectors 102A-102C are child sectors of sectors 101A-101C. Child sectors are assigned to the same logical block addresses as their parent sectors. For example, if 100 parent sectors have logical block addresses (LBAs) of 0 to 99, then 100 child sectors also have LBAs of 0 to 99. Thus, parent-child relationships allow child sectors to inherit the LBAs of their parent sectors. The logical block addresses (LBAs) within a sector set can be sequential or non-sequential.

A host operating system can access data stored in a sector set by sending a set of LBAs and a sector set number (e.g., sector set 102) to the hard disk drive. The LBAs and the sector set number identify the sector set that contains the requested data. Firmware 114 in the hard disk drive uses the LBAs and the sector set number to lookup a set of physical addresses (e.g., cylinder head sector numbers). The hard disk drive uses the physical addresses to locate the sectors that store the requested data. Each sector in a hard disk drive has a unique physical address.

An advantage of the present invention is that a host operating system does not have to keep track of the logical block addresses (LBAs) of the sectors that store additional versions of data. Instead, the host operating system only needs to keep track of the LBAs for the original version of the data and a sector set number for the version of the data that needs to be accessed. Thus, embodiments of the present invention can reduce overhead in the host operating system.

Firmware 114 keeps track of parent-child relationships between the sector sets. Parent-child relationships between sectors allow firmware 114 to build sector set branches. A single set of parent sectors can have multiple sets of child sectors. Sibling sectors are sectors that have the same parent sector but are not part of the same sector set.

Sector set 102A-102C and other child sector sets of the present invention can, for example, be stored on the magnetic hard disk 110 or in non-volatile semiconductor memory 112, such as Flash memory, within hard disk drive 100. The parent sectors 101A-101C are typically stored on the hard disk 110 or other data storage medium.

Firmware 114 also stores a list of the sectors 102A-102C that have been updated. Updated sectors are also referred to as dirty sectors. A sector is added to a list of dirty sectors when its data contents are updated. A list of dirty sectors is maintained for a sector set as an indication that a prior version of the data in the dirty sectors is stored in the parent sectors of the dirty sectors.

In the example of FIG. 1, data contents a, b, and c are stored in sectors 101A, 101B, and 101C, respectively. Sectors 101A, 101B, and 101C are the parents of child sectors 102A, 102B, and 102C, respectively. Data contents d and e are stored in sectors 102A and 102B, respectively. The list of dirty sectors is updated to include sectors 102A and 102B after data contents d and e are stored there. The thick border boxes in the figures represent updated sectors that are in the list of dirty sectors.

The data storage device can separately access the first version of the data stored in sectors 101A-101C and the second version of the data in sectors 102A, 102B, and 101C. A third version of the data can be stored in another sector set that is a child sector set of sectors 102A-102C or sectors 101A-101C. Additional sector sets can also be created to store more versions of the data.

Figure 2B:
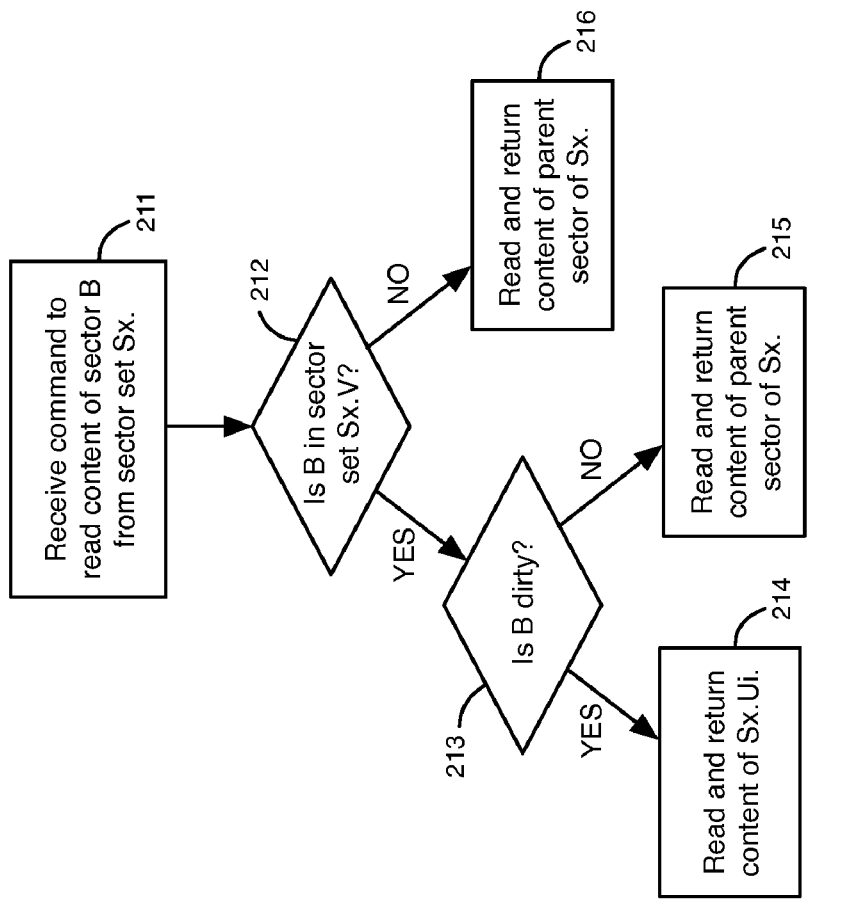
FIG. 2B illustrates a process for reading data from a sector set, according to an embodiment of the present invention.
Figure 2A:
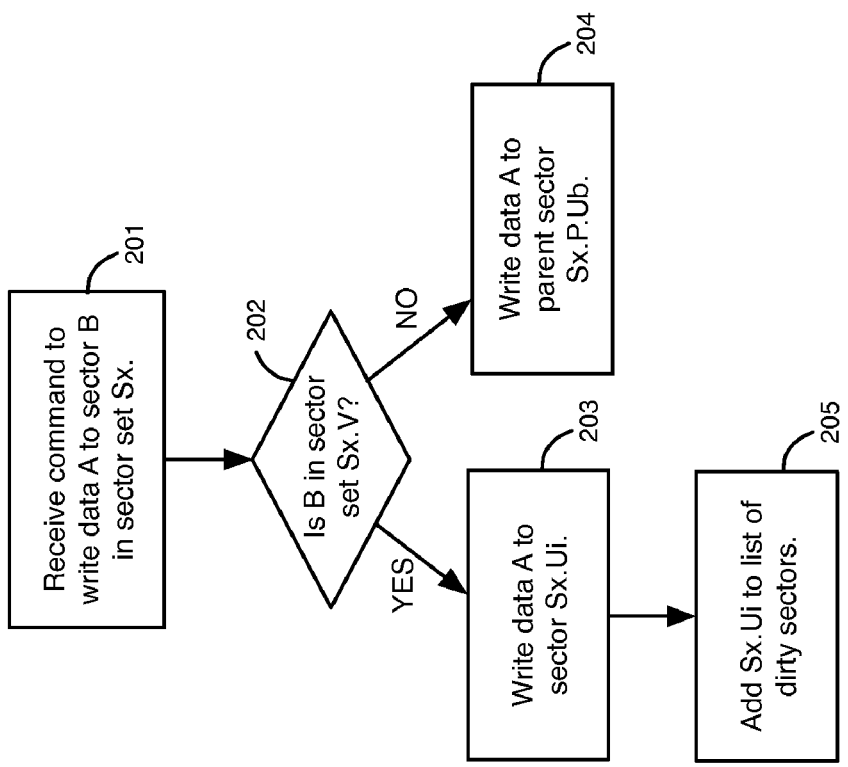
FIG. 2A illustrates a process for writing data to a sector set, according to an embodiment of the present invention.

According to various embodiments of the present invention, read and write operations are directed to a specific sector set. For example, the read and write operations can be directed to a specific sector set via an index in the command. FIG. 2A illustrates a process for writing data to a sector set, according to an embodiment of the present invention. FIG. 2B illustrates a process for reading data from a sector set, according to an embodiment of the present invention.

The following notation is used in the context of various embodiments of the present invention that are described herein. V refers to the ordered set of LBAs under versioning control ($V \subseteq system_{LBA}$). U refers the ordered set of spare sectors that are allocated to sector set V for storing a version of the data stored in V (where $|V|=|U|$). D is a subset of $|V| \times |U|$, i.e. the updated (dirty) sectors. P is a parent sector set for which S.V is a subset of P.V $\cup$ (R.V−$U^N_{i=0}T_i.V$). The R sector set is the root sector set and is always defined and covers the whole system. The root sector set refers to the sectors on the whole hard disk drive (or other type of data storage device). Root sectors store the original version of the data.

Referring to FIG. 2A, the storage device receives a command Write(Sx, B, A) from a host operating system to write data A to the sector having an LBA of B in sector set Sx.U, at step 201. Sector set Sx.V represents the sectors under versioning control, and Sx.U represents the sectors used to store the updates.

At decisional step 202, the storage device determines if sector B is under versioning control (i.e., whether sector B is an element of sector set Sx.V). The storage device also determines the index number i of sector B in set Sx.U. Index number i indicates the location of a sector in the ordered set Sx.U. If sector B is in sector set Sx.V, the storage device writes data A in $i^{th}$ sector in Sx.U at step 203, i.e., Sx.Ui=A.

At step 205, the storage device adds sector Sx.Ui to the list of dirty sectors Sx.D for sector set Sx. If the storage device determines that sector B is not in the sector set Sx.V at step 202, the storage device writes data A to sector B in the parent sector set of Sx at step 204 (i.e., Sx.P.Ub=A). If the parent sector set of sector Sx does not contains sector B, then the storage device writes to sector B in the parent sector set of the parent sector set of Sx. The process continues until sector B is located.

Referring to FIG. 2B, the storage device receives a read command Read(Sx, B) from the host operating system to read data from the sector having an LBA of B in sector set Sx, at step 211. At decisional step 212, the storage device determines if sector B is under versioning control (i.e., whether sector B is an element of Sx.V). At decisional step 213, the storage device determines if sector B is an element of the list of dirty sectors Sx.D for sector set Sx. If sector B is an element of Sx.V and in list Sx.D, then the storage device reads and returns the data content of Sx.Ui, at step 214.

If sector B is an element of Sx.V, but sector B is not in list Sx.D, the storage device reads and returns the data content of the parent sector of Sx at step 215. If sector B is not an element of list Sx.V, the storage device reads and returns the data content of the parent sector of Sx at step 216.

Additional operations can be performed with sector sets, according to further embodiments of the present invention. For example, a data storage device can perform a Read Dirty operation to read and return the data contents of all of the dirty sectors within a particular sector set. For example, operation ReadDirty(Sx) can read the contents of Sx.D.

A data storage device can also perform a write update operation to update a sector set directly without having to lookup the LBAs of the sector set. For example, write operation WriteUpdate(Sx, i, A) causes the data storage device to write data A directly to a sector set Sx, such that Sx.Ui=A, where i is an index in the sector set.

Alternatively, a data storage device can perform a write operation to directly update a sector set without transferring data from a host operating system. For example, write operation WriteUpdateFromLBA(Sx, i, b) causes the data storage device to write data from a root sector b to sector set Sx, such that Sx.Ui=Rb.

A data storage device can also perform a commit operation to make a temporary file that is stored in a sector set persistent. When the data storage device makes a temporary file stored in a sector set persistent, the data in the temporary file is written to the parent sector set. For example, a Commit(Sx, Sy) operation causes the contents of sector set Sx to be written to the parent sector set Sy and causes all of the children of Sx to be children of Sy. If any of the sectors in the temporary file are empty, the corresponding parent sectors retain their original contents after the commit operation.

A data storage device can also perform an operation that causes a sector set to be deleted. For example, a Delete(Sx) operation removes sector set Sx. Delete(Sx) also updates the sectors in child sector set Sy such that the parent sectors of Sx are now parent sectors of Sy.

A data storage device can also perform an operation that creates a new sector set for storing a new version of data. For example, a data storage device can perform a MakeSectorSet (Sx, V, P) operation to create a new version of a sector set within V. The MakeSectorSet operation assigns each newly created sector set to a set of parent sectors P.

Sector sets can be created statically or dynamically. Static sector sets are created by assigning a range of physical addresses on a data storage device to a sector set at the time that the sector set is created. The range of physical addresses contains enough storage space for the entire sector set. In a dynamic sector set, physical addresses are not assigned to all of the sectors in a sector set until a host system makes a request to write data to a particular sector.

Figure 3A:
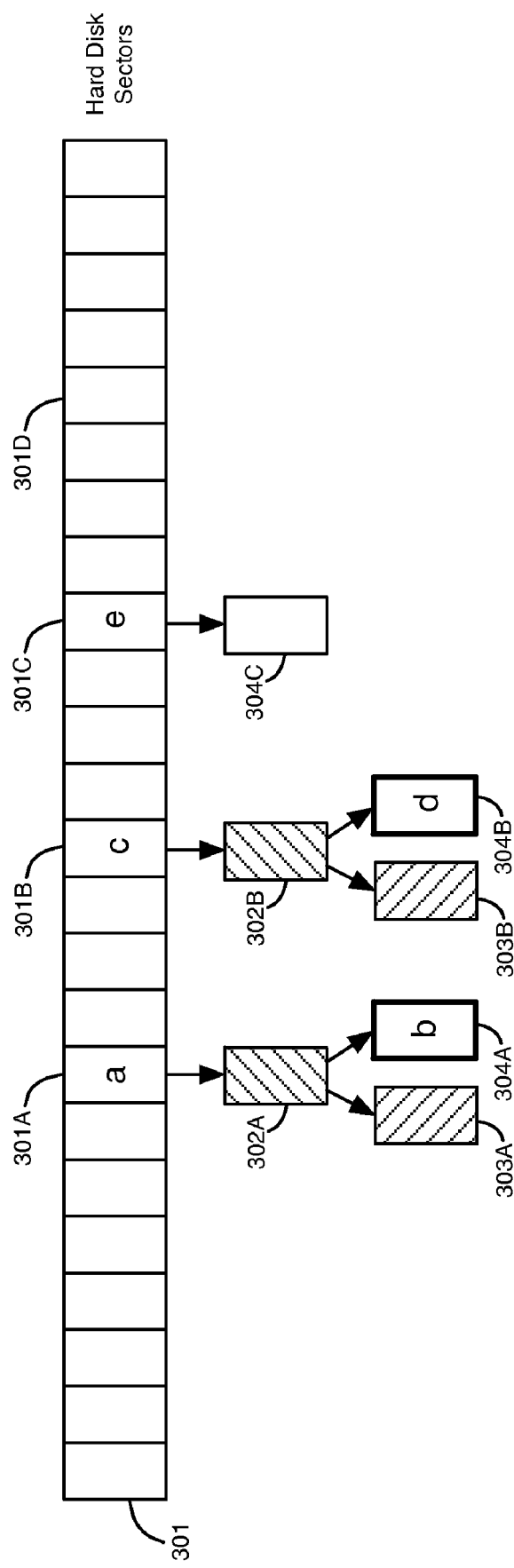
FIG. 3A illustrates an example of a portion of a hard disk drive that stores multiple sector sets, according to an embodiment of the present invention.

FIG. 3A illustrates an example of a portion of a hard disk drive that stores multiple sector sets, according to an embodiment of the present invention. The hard disk drive contains sectors 301, including sectors 301A, 301B, 301C, and 301D. Data contents a, c, and e are stored in sectors 301A, 301B, and 301C, respectively. Sector 301D is empty.

The hard disk drive has created three additional sector sets for storing additional versions of the data stored in sector set 301. Specifically, the hard disk drive has created a second sector set 302A and 302B for storing a version of the data stored in sectors 301A and 301B, respectively. Sectors 302A and 302B are children of sectors 301A and 301B.

The hard disk drive has also created a third sector set 303A and 303B for storing a version of the data stored in sectors 302A and 302B, respectively. Sectors 303A and 303B are children of sectors 302A and 302B.

The hard disk drive has also created a fourth sector set 304A, 304B, and 304C. Sectors 304A and 304B are created for storing a version of the data stored in sectors 302A and 302B, respectively. Sector 304C stores a version of the data stored in sector 301C. Sectors 304A-304B are siblings of sectors 303A-303B, because these two sector sets store alternate versions of the data in sectors 302A-302B.

Sectors 304A and 304B store data contents b and d. After sectors 304A and 304B have been updated with data contents b and d, sectors 304A-304B are added to a list of dirty sectors for the sector sets shown in FIG. 3A.

Figure 3B:
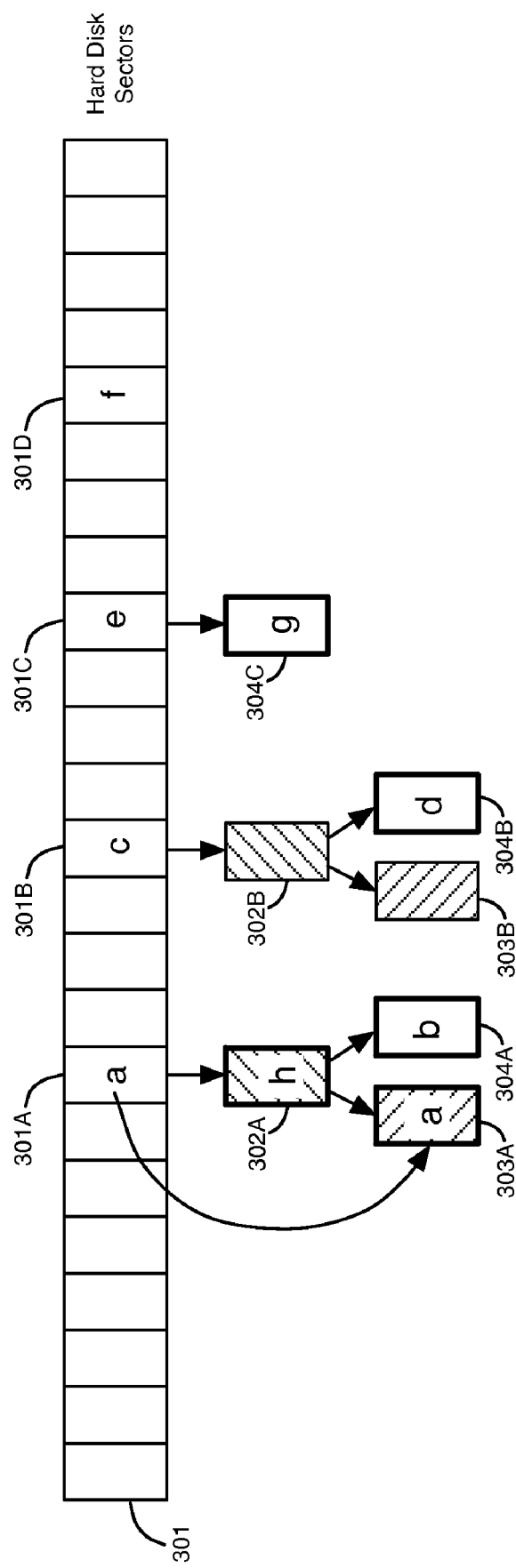
FIG. 3B illustrates an example of how data can be written to and read from multiple sector sets in a hard disk drive, according to an embodiment of the present invention.

FIG. 3B illustrates an example of how data can be written to and read from multiple sector sets in a hard disk drive, according to an embodiment of the present invention. FIG. 3B illustrates the same sectors shown in FIG. 3A.

Each write command (e.g., received from a host operating system) indicates a sector set number and the LBAs that are used to identify the target sectors to write the data in. Each read command (e.g., received from a host operating system) indicates a sector set number and the LBAs that are used to identify the target sectors to access the data from.

Examples of write operations are now described with respect to the sectors shown in FIG. 3B. According to a first example, the hard disk drive receives a command to write data f to the sector in sector set 302 that has the same LBA as sector 301D. Because none of the sectors in sector set 302 have the same LBA as sector 301D, the hard disk drive writes data f directly to sector 301D.

As another example, the hard disk drive receives a command to write data g to the sector in sector set 304 that has the same LBA as sector 301C. In response, the hard disk drive writes data g to sector 304C, and sector 304C is added to the list of dirty sectors.

The hard disk drive can also receive a command to write data h to the sector in sector set 302 that has the same LBA as sector 301A. In response, the hard disk drive writes data h to sector 302A, and sector 302A is added to the list of dirty sectors.

After a write operation, the hard disk drive updates the children of each sector in the sector set that was affected by the write operation. For example, for each child sector Sy of sector set Sx, if sector C is an element of Sy.V, and sector C is not an element of Sy.D (i.e. sector C is not dirty in Sy), then the hard disk drive writes the old sector value of sector C to sector Sy.

In the example of FIG. 3B, if sector 303A is left empty, a read to sector 303A will return the contents of sector 302A, because sector 302A is the parent of sector 303A. In order to preserve the ability of sector 303A to refer back to the contents of sector 301A, the data content (i.e., a) of sector 301A is written into sector 303A as shown in FIG. 3B after h is written to sector 302A.

According to another embodiment, a storage device can abort a write operation to a parent sector set if one or more child sectors of that parent sector set become inconsistent (e.g., their data contents change in an unintended manner).

Examples of read operations are now described with respect to the sectors shown in FIG. 3B. If the hard disk drive receives a command to read data from the sector in sector set 302 that has the same LBA as sector 301D, the hard disk drive determines if any sectors in set 302 have the same LBA as sector 301D (i.e. if sector 301D belongs to sector set 302). Because sector set 302 does not have any sectors that have the same LBA as sector 301D, the hard disk drive returns data f stored in sector 301D.

If the hard disk drive receives a command to read data from the sector in sector set 304 that has the same LBA as sector 301C, the hard disk drive determines if any sectors in set 304 have the same LBA as sector 301C. Because sector 304C is the child of sector 301C, sectors 301C and 304C have the same LBAs, and as a result, the hard disk drive reads and returns data g stored in sector 304C.

If the hard disk drive receives a command to read data from the sector in sector set 302 that has the same LBA as sector 301C, the hard disk drive determines if any sectors in set 302 have the same LBA as sector 301C. Because sector set 302 does not have any sectors that have the same LBA as sector 301C, the hard disk drive reads and returns data e stored in root sector 301C.

If the hard disk drive receives a command to read data from the sector in sector set 302 that has the same LBA as sector 301A, the hard disk drive determines if any sectors in set 302 have the same LBA as sector 301A. Because sector 302A is the child of sector 301A, sectors 301A and 302A have the same LBA, and as a result, the hard disk drive reads and returns data h from sector 302A.

If the hard disk drive receives a command to read data from the sector in sector set 303 that has the same LBA as sector 301A, the hard disk drive determines if any sectors in set 303 have the same LBA as sector 301A. Because sector 303A is the grandchild of sector 301A, sectors 301A and 303A have the same LBA, and as a result, the hard disk drive reads and returns data a from sector 303A.

If the hard disk drive receives a command to read data from the sector in sector set 303 that has the same LBA as sector 301B, the hard disk drive determines if any sectors in set 303 have the same LBA as sector 301B. Sectors 301B, 302B, and 303B have the same LBAs. The hard disk drive then determines if sector 303B contains data. After the hard disk drive determines that sector 303B is empty, the hard disk drive checks the contents of its parent sector 302B. Because sector 302B is also empty, the hard disk drive reads and returns data c from the sector 301B.

Embodiments of the present invention described herein greatly reduce the need for application code to keep track of old sector data, which increases the performance of the application and the file system. Also, embodiments of the present invention place a data storage system in much a better position to keep track of old data, and manage the LBA resources.

Embodiments of the present invention can also improve random write performance. If writes to a given sector set are redirected to sector set U and the LBAs of the sectors within sector set U are sequential, write and read seek time is greatly reduced compared to a system that stores updated files in a non-sequential manner.

A data storage system using embodiments of the present invention can guarantee the consistent state of each version of the data. Each time a sector is updated, the data storage system uses the parent-child relationships between the sectors to locate child sectors of an updated sector and update the child sectors if necessary to maintain the consistency of the files. For example, the consistency of sector set branches can be maintained by automatically propagating an old copy of a written sector to all the empty children of a sector set.

Virtual machines virtualize systems by storing the virtual hard disk drive content into a file. Virtual machines also provide the option of having differential virtual machine files. A differential file is a system file that stores only new writes, while referring to a base system file for reads to sectors that have not being written after differential file creation.

According to an embodiment of the present invention, a data storage system that supports sector sets allows a simplified implementation of differential virtual system files with higher performance. A differential system file defines the sectors of the base system file to be a new sector set (e.g., sector set Svm). Each version of the base system file is stored in a different sector set.

At startup, the virtual machine initializes Svm.U and Svm.D with the current value of the differential file. This operation does not need any data transfer. Only the LBA addresses need to be sent to the hard disk drive. Also at startup, the virtual machine issues all system commands to the system to the Svm sector set. Once the virtual machine stops execution, the Svm.U sectors can be read out and stored in the differential system file, if required.

If the virtual machine has direct access to the system (i.e. direct access to a block device for performance reasons), differential files are not possible. A data storage system supporting sector sets can allow the virtual machine to have direct access to the data storage system. In some embodiments, multiple virtual machines can share the same directly attached device.

According to a further embodiment of the present invention, sector sets can be used to implement snapshots of data. Each snapshot that is taken of the original data is saved as a separate file and stored in a newly created sector set. The original data is not erased. Each newly created sector set is a child set of a previously created sector set or of the root sectors. If the sector sets that store the snapshots have sequential LBAs, the time it takes to read the snapshots is significantly reduced.

A file system is a technique for storing and organizing computer files to facilitate the process of locating the files. File system software can be used to manage data blocks that are stored on a data storage device, such as a hard disk drive. The file system organizes the data blocks into files and directories. The file system also keeps track of which data blocks belong to which file and which data blocks are not being used. The inode term is often used to refer to the data structure on a file system that stores information about a regular file, directory, or other file system object.

A journaling file system is a file system that logs changes to a journal before writing the changes to the main file system. At regular time intervals, the changes in the journal are committed to the file system. Such file systems are less likely to become corrupted on a power failure or system crash.

According to another embodiment of the present invention, a data storage device uses sector sets as described above to store and keep track of changes to a file system before the changes are written to the file system, instead of having a host operating system implement a journaling technique to keep track of the changes. Each inode in the file system becomes part of a sector set. Every write operation that attempts to write updated data to an inode actually writes the updated data to a sector set, instead of the root sectors that contain the original inode data. To make the updated data permanent, a Commit operation as described above is used to write the updated data from the sector set to the root inode sectors.

This embodiment can simplify journaling techniques by defining inode structures in a file system to be one or more sector sets. Special journaling sectors are not required for existing inodes. For newer inodes, special treatment is required, but that can be avoided by pre-allocating some invalid inodes and putting those inodes under versioning control using sector sets, as described above.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, variations, and substitutions are possible in light of the above teachings, without departing from the scope of the present invention.

The invention claimed is:

1. A data storage device comprising:
a data storage medium configured to store a first version of data in parent sectors, and a second version of the data in first child sectors, wherein each of the first child sectors is assigned to a same logical block address as one of the parent sectors; and
data storage firmware that is configured to identify physical addresses that correspond to logical block addresses and a sector set number in response to a request to access the first child sectors, wherein the data storage device uses the physical addresses to identify locations of the first child sectors.

2. The data storage device defined in claim 1 wherein the data storage medium is configured to store a third version of the data in second child sectors, wherein each of the second child sectors is assigned to the logical block address of one of the parent sectors.

3. The data storage device defined in claim 1 wherein the data storage device manages consistency of sector sets by automatically propagating an old version of a written sector to all child sectors of a sector set.

4. The data storage device defined in claim 2 wherein the data storage device manages consistency of sector sets by aborting writes to a parent sector set if a child sector set becomes inconsistent.

5. The data storage device defined in claim 1 wherein the data storage device is a hard disk drive and the data storage medium is a magnetic hard disk.

6. The data storage device defined in claim 1 wherein the data storage device statically allocates sectors for each sector set.

7. The data storage device defined in claim 1 wherein the data storage system dynamically allocates sectors for each sector set.

8. The data storage device defined in claim 1 further comprising:
nonvolatile semiconductor memory, wherein the data storage firmware is configured to store the first child sectors in the nonvolatile semiconductor memory.

9. The data storage device defined in claim 1 wherein the first child sectors are stored on the data storage medium.

10. A data storage system that comprises code for storing versions of data in sector sets, wherein the code is stored on a computer readable storage medium in the data storage system, the data storage system comprising:

a data storage medium;

code for storing a first version of data in a parent sector set, the parent sector set having logical block addresses;

code for storing a second version of the data in a first child sector set, wherein the first child sector set has the same logical block addresses as the parent sector set; and code for identifying first physical addresses of the first child sector set in response to receiving the logical block addresses and a first sector set number corresponding to the first child sector set, wherein the data storage system uses the first physical addresses to locate sectors in the first child sector set.

11. The data storage system defined in claim 10 wherein the data storage device is a hard disk drive and the data storage medium is a hard disk.

12. The data storage system defined in claim 10 further comprising:

code for storing a third version of the data in a second child sector set, wherein the second child sector set has the same logical block addresses as the parent sector set; and code for identifying second physical addresses of the second child sector set in response to receiving the logical block addresses and a second sector set number corresponding to the second child sector set, wherein the data storage system uses the second physical addresses to locate sectors in the second child sector set.

13. The data storage system defined in claim 10 further comprising:

code for managing consistency of the sector sets by automatically propagating an old version of a written sector to all child sectors of a sector set.

14. The data storage system defined in claim 10 further comprising:

code for managing consistency of the sector sets by aborting writes to a parent sector set if a child sector set becomes inconsistent.

15. The data storage system defined in claim 10 wherein the code for storing the second version of the data in the first child sector set further comprises code for storing the first child sector set in nonvolatile semiconductor memory.

16. The data storage system defined in claim 11 wherein the code for storing the second version of the data in the first child sector set further comprises code for storing the first child sector set on the hard disk.

17. The data storage system defined in claim 11 wherein the code for storing the second version of the data in the first child sector set further comprises code for storing the second version of the data in sectors in the first child sector set that have sequential logic block addresses.

18. A hard disk drive comprising:

a hard disk configured to store a first version of data in a parent sector set, and a second version of the data in a child sector set without overwriting the first version of the data stored in the parent sector set, wherein the child sector set has the same logical block addresses as the parent sector set; and data storage firmware configured to identify physical addresses assigned to the child sector set in response to receiving the logical block addresses and a sector set number corresponding to the child sector set, the hard disk drive using the physical addresses to locate sectors in the child sector set.

19. The hard disk drive defined in claim 18 further comprising:

nonvolatile semiconductor memory, wherein the data storage firmware is configured to store the child sector set in the nonvolatile semiconductor memory.

20. The hard disk drive defined in claim 18 wherein the data storage firmware is configured to store the second version of the data in sectors within the child sector set that have sequential logic block addresses.

* * * * *